(12) United States Patent
Duan et al.

(10) Patent No.: US 11,074,313 B2
(45) Date of Patent: Jul. 27, 2021

(54) ESTIMATING PERFORMANCE GAINS FOR CONTENT ITEM DELIVERY USING PERFORMANCE REPLAY

(71) Applicant: Microsoft Technology Licensing, LLC, Redmond, WA (US)

(72) Inventors: Qing Duan, Santa Clara, CA (US); Jianqiang Shen, San Mateo, CA (US); Wen Pu, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 3 days.

(21) Appl. No.: 16/447,465

(22) Filed: Jun. 20, 2019

(65) Prior Publication Data

US 2020/0401634 A1 Dec. 24, 2020

(51) Int. Cl.
G06F 16/957 (2019.01)
G06F 16/958 (2019.01)
G06Q 30/02 (2012.01)

(52) U.S. Cl.
CPC .......... *G06F 16/957* (2019.01); *G06F 16/958* (2019.01); *G06Q 30/0246* (2013.01); *G06Q 30/0275* (2013.01)

(58) Field of Classification Search
CPC .. G06F 16/957; G06F 16/958; G06F 16/9035; G06Q 30/0275; G06Q 30/0246
USPC .......................................................... 707/748
See application file for complete search history.

(56) References Cited

U.S. PATENT DOCUMENTS

| | | | |
|---|---|---|---|
| 2014/0250099 A1* | 9/2014 | Cierniak | G06F 16/9535 707/710 |
| 2017/0308943 A1* | 10/2017 | Scarasso | G06Q 30/0617 |
| 2018/0211337 A1* | 7/2018 | Ghaddar | G01C 21/3423 |
| 2018/0285473 A1* | 10/2018 | Laptev | G06F 7/026 |

\* cited by examiner

*Primary Examiner* — Kuen S Lu
(74) *Attorney, Agent, or Firm* — Schwegman Lundberg & Woessner, P.A.

(57) ABSTRACT

Technologies for determining performance gains for content item delivery based on modifications to content item selection parameters are provided. The disclosed techniques include implementing a multi-objective optimization model for content item selection using a value for a parameter. The model generates a first plurality of scores and a first ranking for content items. Subset of content items is selected for delivery based on the first ranking. New values for the parameter are identified and for each new value, the content item selection event is replayed. A second plurality of scores and a second ranking is generated for the content items, where the second ranking is different from the first ranking. A third plurality of scores and a third ranking is generated where the third ranking matches the second ranking. A set of gains is calculated for each new value, where each gain corresponds to a different objective of the model.

16 Claims, 7 Drawing Sheets

| 510 Request ID | 512 MOO Score | 514 RANK | 516 Final Bid | 518 pCTR | 520 pApply | 522 isClicked | 524 isApplied | 526 eCPC | 528 Rate Bid Card |
|---|---|---|---|---|---|---|---|---|---|
| 101 | 12.01 | 1 | 1.98 | 0.021 | 0.079 | 1 | 0 | 0.9 | 2 |
| 102 | 11.5 | 2 | 1.6 | 0.023 | 0.079 | 1 | 1 | 0.8 | 2 |
| 103 | 9.6 | 3 | 2.64 | 0.024 | 0.075 | 1 | 0 | 1.1 | 2 |
| 104 | 5.6 | 4 | 1.56 | 0.02 | 0.07 | 1 | 1 | 0.8 | 2 |
| 105 | 3.8 | 5 | 1.87 | 0.018 | 0.06 | 0 | 0 | 1.2 | 2 |

540 →

| 510 Request ID | 512 MOO Score | 514 RANK | 516 Final Bid | 518 pCTR | 520 pApply | 522 isClicked | 524 isApplied | 526 eCPC | 528 Rate Bid Card |
|---|---|---|---|---|---|---|---|---|---|
| 101 | 11.91 | 2 | 1.98 | 0.021 | 0.079 | 1 | 0 | 0.9 | 2 |
| 102 | 13.45 | 1 | 1.6 | 0.023 | 0.079 | 1 | 1 | 0.8 | 2 |
| 103 | 9.1 | 3 | 2.64 | 0.024 | 0.075 | 1 | 0 | 1.1 | 2 |
| 104 | 7.6 | 4 | 1.56 | 0.02 | 0.07 | 1 | 1 | 0.8 | 2 |
| 105 | 4.8 | 5 | 1.87 | 0.018 | 0.06 | 0 | 0 | 1.2 | 2 |

ESTIMATING PERFORMANCE GAINS FOR CONTENT ITEM DELIVERY USING PERFORMANCE REPLAY

TECHNICAL FIELD

The present disclosure relates to estimating performance gains caused by modifying parameters associated with content item selection for content delivery to users.

BACKGROUND

Content management systems are designed to provide content items to users for consumption. Content items may represent content such as photos, video, job posts, news articles, documents, user posts, audio, and many more. Determining which content items to present to users may be based upon preferred objectives of the content management system. For example, content delivery may be optimized for maximizing duration of user sessions, click though rates on content items, measurable engagement by users, and/or any other objective. Optimizing content item delivery may include adjusting one or more configuration parameters.

Conventional content management systems may implement various forms of A/B testing to evaluate parameter value changes in order to determine whether or not the changes yield better performance optimization of content item delivery. A/B testing represents a randomized experiment with two variants, A and B. Variant A may implement content item delivery parameters that represent the current setup. The set of users who are exposed to variant A is commonly called the control group. Variant B may implement a modified content item delivery parameter and may be applied to another of users, referred to as the treatment group. Observed responses from users of the control group and the treatment group may be collected. The observed responses may then be analyzed to determine whether performance improvements are associated with the modified content item delivery parameter of variant B. However, performance of A/B tests generally require performing the tests in an online environment over an extended period of time, such as several days or a week.

The A/B tests are configured to test modification of one parameter at a time. The duration of time needed to perform the A/B tests may result in an extended testing timeline if the modification tested results in little to no performance gain or even a negative performance output. Additionally, if multiple parameter modifications needed to be tested, then multiple A/B tests may need to be performed for each modification, resulting in a long testing cycle. Thus, approaches that reduce testing cycles for testing parameter changes are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 5 depicts example tables of calculated multi-objective optimization scores for a plurality of candidate content items.

DETAILED DESCRIPTION

Figure 1:
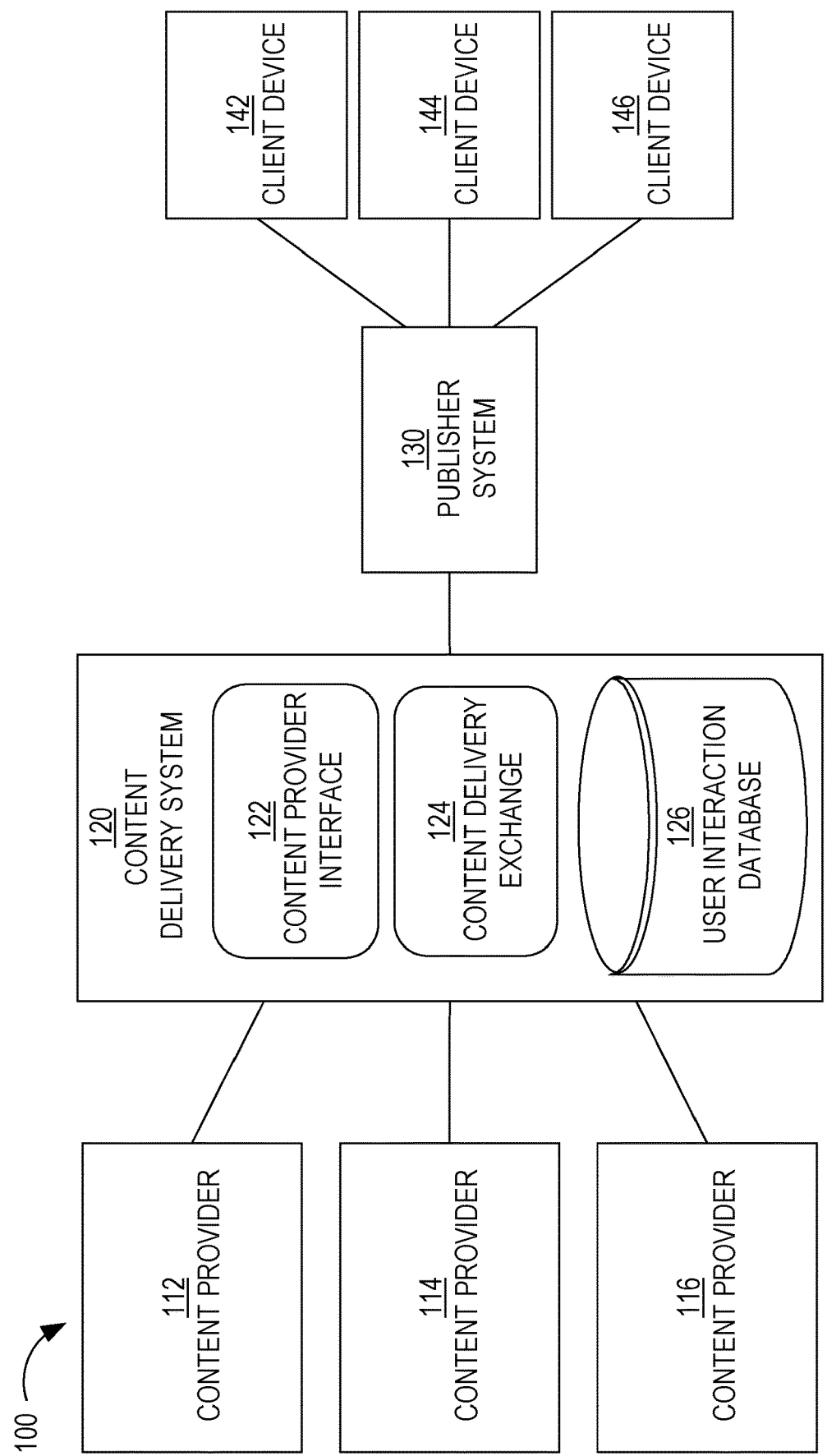
FIG. 1 is a block diagram that depicts a system for distributing content items to one or more end-users, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In an embodiment, a content management system may perform content item selection events that involve selecting one or more content items from a plurality of candidate content items to present to a client device. The content item selection event may be in response to a request for content items to be presented as part of a feed of content items or any other user-based content item presentation service. The content item selection event may include ranking and selecting a subset of content items from the plurality of candidate content items based upon multiple objectives. In an embodiment, the content management system may implement a multi-objective optimization model that optimizes content item selection based upon multiple objectives for content item delivery. For example, the multi-objective optimization model may be tuned to optimize for user engagement, job relevance to users, and any other desired objective. The multi-objective optimization model may incorporate multiple tuning parameters each configured for the desired objectives.

In an embodiment, the multi-objective optimization model may access historical interactions of users during user sessions and content item selection data in order to populate the multi-objective optimization model. A first plurality of scores may be generated for each of the candidate content items. Scores may represent a multi-objective optimization score that incorporates and weighs each of the multiple objectives according to one or more tuning parameters. The scores assigned to each of the candidate content items may be used to rank the candidate content items in terms of how well the candidate content items are suited for content item delivery based upon the desired objectives.

In an embodiment, one or more parameters may be modified in order to improve optimization of content item delivery to users. For a particular parameter, a plurality of possible values may be identified. For each of the possible values of the particular parameter, the content management system may replay the historical user interaction data and content item selection data while applying a particular possible value of the particular parameter. Upon completing the replay using the particular possible value of the particular parameter, the content management system may calculate a second plurality of scores for each of the candidate content items. The second plurality of scores may reflect a modification of how the multiple objectives are weighted with respect to one another. The content management system may re-rank the candidate content items to generate a second ranking, which is different from the first ranking based upon the modified value on the particular parameter. In an embodiment, the scores for each of the candidate content items is based upon their ranking. For example, the scores may incorporate objective functions for each of the desired objectives, where the objective functions include input parameters that incorporate the current ranking of the candidate content item with respect to the other candidate content items.

The content management system, upon determining the second ranking may recalculate the scores to generate a third plurality of scores based upon the second ranking for each of the candidate content items. A third ranking may be generated, using the third plurality of scores. The content management system may determine whether the third ranking is different from the second ranking for the plurality of candidate content items. If the third ranking of candidate content items is different from the second ranking of the candidate content items, then the content management system may repeat the score calculation and ranking steps using the previous ranking in order to calibrate the scores such that the rankings of the candidate content items are consistent with the previous ranking. If the second ranking and the third ranking for the candidate content items are identical, then the content management system may determine a set of gains corresponding to the different objectives. If there is a measurable gain as a result of modifying the particular parameter by the possible value, then the content management system may apply the modified parameter value to future content item delivery campaigns.

The disclosed approaches provide advantages over conventional solutions by implementing the multi-objective optimization model that uses historical user interaction data and content item selection data to simulate potential content item delivery performance gains based on modified parameter values for a multi-objective optimization algorithm. The potential content item delivery performance gains may be analyzed to determine whether the modified parameter values should be applied to content item selection events or whether online testing of the modified parameter values should be pursued. Determining whether the modified parameter values should be implemented or further tested may reduce the processing resources devoted to testing each potential parameter modification without knowing whether the parameter modification yields potential performance gains.

System Overview

FIG. 1 is a block diagram that depicts a system 100 for distributing content items to one or more end-users, in an embodiment. System 100 includes content providers 112-116, a content delivery system 120, a publisher system 130, and client devices 142-146. Although three content providers are depicted, system 100 may include more or less content providers. Similarly, system 100 may include more than one publisher and more or less client devices.

Content providers 112-116 interact with content delivery system 120 (e.g., over a network, such as a LAN, WAN, or the Internet) to enable content items to be presented, through publisher system 130, to end-users operating client devices 142-146. Thus, content providers 112-116 provide content items to content delivery system 120, which in turn selects content items to provide to publisher system 130 for presentation to users of client devices 142-146. However, at the time that content provider 112 registers with content delivery system 120, neither party may know which end-users or client devices will receive content items from content provider 112.

An example of a content provider includes an advertiser. An advertiser of a product or service may be the same party as the party that makes or provides the product or service. Alternatively, an advertiser may contract with a producer or service provider to market or advertise a product or service provided by the producer/service provider. Another example of a content provider is an online ad network that contracts with multiple advertisers to provide content items (e.g., advertisements) to end users, either through publishers directly or indirectly through content delivery system 120.

Although depicted in a single element, content delivery system 120 may comprise multiple computing elements and devices, connected in a local network or distributed regionally or globally across many networks, such as the Internet. Thus, content delivery system 120 may comprise multiple computing elements, including file servers and database systems. For example, content delivery system 120 includes (1) a content provider interface 122 that allows content providers 112-116 to create and manage their respective content delivery campaigns and (2) a content delivery exchange 124 that conducts content item selection events in response to content requests from a third-party content delivery exchange and/or from publisher systems, such as publisher system 130.

Publisher system 130 provides its own content to client devices 142-146 in response to requests initiated by users of client devices 142-146. The content may be about any topic, such as news, sports, finance, and traveling. Publishers may vary greatly in size and influence, such as Fortune 500 companies, social network providers, and individual bloggers. A content request from a client device may be in the form of a HTTP request that includes a Uniform Resource Locator (URL) and may be issued from a web browser or a software application that is configured to only communicate with publisher system 130 (and/or its affiliates). A content request may be a request that is immediately preceded by user input (e.g., selecting a hyperlink on web page) or may be initiated as part of a subscription, such as through a Rich Site Summary (RSS) feed. In response to a request for content from a client device, publisher system 130 provides the requested content (e.g., a web page) to the client device.

Simultaneously or immediately before or after the requested content is sent to a client device, a content request is sent to content delivery system 120 (or, more specifically, to content delivery exchange 124). That request is sent (over a network, such as a LAN, WAN, or the Internet) by publisher system 130 or by the client device that requested the original content from publisher system 130. For example, a web page that the client device renders includes one or more calls (or HTTP requests) to content delivery exchange 124 for one or more content items. In response, content delivery exchange 124 provides (over a network, such as a LAN, WAN, or the Internet) one or more particular content items to the client device directly or through publisher system 130. In this way, the one or more particular content items may be presented (e.g., displayed) concurrently with the content requested by the client device from publisher system 130.

In response to receiving a content request, content delivery exchange 124 initiates a content item selection event that involves selecting one or more content items (from among multiple content items) to present to the client device that initiated the content request. An example of a content item selection event is an auction.

Content delivery system 120 and publisher system 130 may be owned and operated by the same entity or party. Alternatively, content delivery system 120 and publisher system 130 are owned and operated by different entities or parties.

A content item may comprise an image, a video, audio, text, graphics, virtual reality, or any combination thereof. A content item may also include a link (or URL) such that, when a user selects (e.g., with a finger on a touchscreen or with a cursor of a mouse device) the content item, a (e.g., HTTP) request is sent over a network (e.g., the Internet) to a destination indicated by the link. In response, content of a web page corresponding to the link may be displayed on the user's client device.

Examples of client devices 142-146 include desktop computers, laptop computers, tablet computers, wearable devices, video game consoles, and smartphones.

Bidders

In a related embodiment, system 100 also includes one or more bidders (not depicted). A bidder is a party that is different than a content provider, that interacts with content delivery exchange 124, and that bids for space (on one or more publisher systems, such as publisher system 130) to present content items on behalf of multiple content providers. Thus, a bidder is another source of content items that content delivery exchange 124 may select for presentation through publisher system 130. Thus, a bidder acts as a content provider to content delivery exchange 124 or publisher system 130. Examples of bidders include AppNexus, DoubleClick, and LinkedIn. Because bidders act on behalf of content providers (e.g., advertisers), bidders create content delivery campaigns and, thus, specify user targeting criteria and, optionally, frequency cap rules, similar to a traditional content provider.

In a related embodiment, system 100 includes one or more bidders but no content providers. However, embodiments described herein are applicable to any of the above-described system arrangements.

Content Delivery Campaigns

Each content provider establishes a content delivery campaign with content delivery system 120 through, for example, content provider interface 122. An example of content provider interface 122 is Campaign Manager™ provided by LinkedIn. Content provider interface 122 comprises a set of user interfaces that allow a representative of a content provider to create an account for the content provider, create one or more content delivery campaigns within the account, and establish one or more attributes of each content delivery campaign. Examples of campaign attributes are described in detail below.

A content delivery campaign includes (or is associated with) one or more content items. Thus, the same content item may be presented to users of client devices 142-146. Alternatively, a content delivery campaign may be designed such that the same user is (or different users are) presented different content items from the same campaign. For example, the content items of a content delivery campaign may have a specific order, such that one content item is not presented to a user before another content item is presented to that user.

A content delivery campaign is an organized way to present information to users that qualify for the campaign. Different content providers have different purposes in establishing a content delivery campaign. Example purposes include having users view a particular video or web page, fill out a form with personal information, purchase a product or service, make a donation to a charitable organization, volunteer time at an organization, or become aware of an enterprise or initiative, whether commercial, charitable, or political.

A content delivery campaign has a start date/time and, optionally, a defined end date/time. For example, a content delivery campaign may be to present a set of content items from Jun. 1, 2015 to Aug. 1, 2015, regardless of the number of times the set of content items are presented ("impressions"), the number of user selections of the content items (e.g., click throughs), or the number of conversions that resulted from the content delivery campaign. Thus, in this example, there is a definite (or "hard") end date. As another example, a content delivery campaign may have a "soft" end date, where the content delivery campaign ends when the corresponding set of content items are displayed a certain number of times, when a certain number of users view, select, or click on the set of content items, when a certain number of users purchase a product/service associated with the content delivery campaign or fill out a particular form on a website, or when a budget of the content delivery campaign has been exhausted.

A content delivery campaign may specify one or more targeting criteria that are used to determine whether to present a content item of the content delivery campaign to one or more users. (In most content delivery systems, targeting criteria cannot be so granular as to target individual members.) Example factors include date of presentation, time of day of presentation, characteristics of a user to which the content item will be presented, attributes of a computing device that will present the content item, identity of the publisher, etc. Examples of characteristics of a user include demographic information, geographic information (e.g., of an employer), job title, employment status, academic degrees earned, academic institutions attended, former employers, current employer, number of connections in a social network, number and type of skills, number of endorsements, and stated interests. Examples of attributes of a computing device include type of device (e.g., smartphone, tablet, desktop, laptop), geographical location, operating system type and version, size of screen, etc.

For example, targeting criteria of a particular content delivery campaign may indicate that a content item is to be presented to users with at least one undergraduate degree, who are unemployed, who are accessing from South America, and where the request for content items is initiated by a smartphone of the user. If content delivery exchange 124 receives, from a computing device, a request that does not satisfy the targeting criteria, then content delivery exchange 124 ensures that any content items associated with the particular content delivery campaign are not sent to the computing device.

Thus, content delivery exchange 124 is responsible for selecting a content delivery campaign in response to a request from a remote computing device by comparing (1) targeting data associated with the computing device and/or a user of the computing device with (2) targeting criteria of one or more content delivery campaigns. Multiple content delivery campaigns may be identified in response to the request as being relevant to the user of the computing device. Content delivery exchange 124 may select a strict subset of the identified content delivery campaigns from which content items will be identified and presented to the user of the computing device.

Instead of one set of targeting criteria, a single content delivery campaign may be associated with multiple sets of targeting criteria. For example, one set of targeting criteria may be used during one period of time of the content delivery campaign and another set of targeting criteria may be used during another period of time of the campaign. As another example, a content delivery campaign may be associated with multiple content items, one of which may be associated with one set of targeting criteria and another one of which is associated with a different set of targeting criteria. Thus, while one content request from publisher system 130 may not satisfy targeting criteria of one content item of a campaign, the same content request may satisfy targeting criteria of another content item of the campaign.

Different content delivery campaigns that content delivery system 120 manages may have different charge models. For example, content delivery system 120 (or, rather, the entity that operates content delivery system 120) may charge a content provider of one content delivery campaign for each presentation of a content item from the content delivery campaign (referred to herein as cost per impression or CPM). Content delivery system 120 may charge a content provider of another content delivery campaign for each time a user interacts with a content item from the content delivery campaign, such as selecting or clicking on the content item (referred to herein as cost per click or CPC). Content delivery system 120 may charge a content provider of another content delivery campaign for each time a user performs a particular action, such as purchasing a product or service, downloading a software application, or filling out a form (referred to herein as cost per action or CPA). Content delivery system 120 may manage only campaigns that are of the same type of charging model or may manage campaigns that are of any combination of the three types of charging models.

A content delivery campaign may be associated with a resource budget that indicates how much the corresponding content provider is willing to be charged by content delivery system 120, such as $100 or $5,200. A content delivery campaign may also be associated with a bid amount that indicates how much the corresponding content provider is willing to be charged for each impression, click, or other action. For example, a CPM campaign may bid five cents for an impression, a CPC campaign may bid five dollars for a click, and a CPA campaign may bid five hundred dollars for a conversion (e.g., a purchase of a product or service).

Content Item Selection Events

As mentioned previously, a content item selection event is when multiple content items (e.g., from different content delivery campaigns) are considered and a subset selected for presentation on a computing device in response to a request. Thus, each content request that content delivery exchange 124 receives triggers a content item selection event.

For example, in response to receiving a content request, content delivery exchange 124 analyzes multiple content delivery campaigns to determine whether attributes associated with the content request (e.g., attributes of a user that initiated the content request, attributes of a computing device operated by the user, current date/time) satisfy targeting criteria associated with each of the analyzed content delivery campaigns. If so, the content delivery campaign is considered a candidate content delivery campaign. One or more filtering criteria may be applied to a set of candidate content delivery campaigns to reduce the total number of candidates.

As another example, users are assigned to content delivery campaigns (or specific content items within campaigns) "off-line"; that is, before content delivery exchange 124 receives a content request that is initiated by the user. For example, when a content delivery campaign is created based on input from a content provider, one or more computing components may compare the targeting criteria of the content delivery campaign with attributes of many users to determine which users are to be targeted by the content delivery campaign. If a user's attributes satisfy the targeting criteria of the content delivery campaign, then the user is assigned to a target audience of the content delivery campaign. Thus, an association between the user and the content delivery campaign is made. Later, when a content request that is initiated by the user is received, all the content delivery campaigns that are associated with the user may be quickly identified, in order to avoid real-time (or on-the-fly) processing of the targeting criteria. Some of the identified campaigns may be further filtered based on, for example, the campaign being deactivated or terminated, the device that the user is operating being of a different type (e.g., desktop) than the type of device targeted by the campaign (e.g., mobile device).

A final set of candidate content delivery campaigns is ranked based on one or more criteria, such as predicted click-through rate (which may be relevant only for CPC campaigns), effective cost per impression (which may be relevant to CPC, CPM, and CPA campaigns), and/or bid price. Each content delivery campaign may be associated with a bid price that represents how much the corresponding content provider is willing to pay (e.g., content delivery system 120) for having a content item of the campaign presented to an end-user or selected by an end-user. Different content delivery campaigns may have different bid prices. Generally, content delivery campaigns associated with relatively higher bid prices will be selected for displaying their respective content items relative to content items of content delivery campaigns associated with relatively lower bid prices. Other factors may limit the effect of bid prices, such as objective measures of quality of the content items (e.g., actual click-through rate (CTR) and/or predicted CTR of each content item), budget pacing (which controls how fast a campaign's budget is used and, thus, may limit a content item from being displayed at certain times), frequency capping (which limits how often a content item is presented to the same person), and a domain of a URL that a content item might include.

An example of a content item selection event is an advertisement auction, or simply an "ad auction."

In one embodiment, content delivery exchange 124 conducts one or more content item selection events. Thus, content delivery exchange 124 has access to all data associated with making a decision of which content item(s) to select, including bid price of each campaign in the final set of content delivery campaigns, an identity of an end-user to which the selected content item(s) will be presented, an indication of whether a content item from each campaign was presented to the end-user, a predicted CTR of each campaign, a CPC or CPM of each campaign.

In another embodiment, an exchange that is owned and operated by an entity that is different than the entity that operates content delivery system 120 conducts one or more content item selection events. In this latter embodiment, content delivery system 120 sends one or more content items to the other exchange, which selects one or more content items from among multiple content items that the other exchange receives from multiple sources. In this embodiment, content delivery exchange 124 does not necessarily know (a) which content item was selected if the selected content item was from a different source than content delivery system 120 or (b) the bid prices of each content item that was part of the content item selection event. Thus, the other exchange may provide, to content delivery system 120, information regarding one or more bid prices and, optionally, other information associated with the content item(s) that was/were selected during a content item selection event, information such as the minimum winning bid or the highest bid of the content item that was not selected during the content item selection event.

Event Logging

Content delivery system 120 may log one or more types of events, with respect to content item summaries, across client devices 152-156 (and other client devices not depicted). For example, content delivery system 120 determines whether a content item summary that content delivery exchange 124 delivers is presented at (e.g., displayed by or played back at) a client device. Such an "event" is referred to as an "impression." As another example, content delivery system 120 determines whether a content item summary that exchange 124 delivers is selected by a user of a client device. Such a "user interaction" is referred to as a "click." Content delivery system 120 stores such data as user interaction data, such as an impression data set and/or a click data set. Thus, content delivery system 120 may include a user interaction database 128. Logging such events allows content delivery system 120 to track how well different content items and/or campaigns perform.

For example, content delivery system 120 receives impression data items, each of which is associated with a different instance of an impression and a particular content item summary. An impression data item may indicate a particular content item, a date of the impression, a time of the impression, a particular publisher or source (e.g., onsite v. offsite), a particular client device that displayed the specific content item (e.g., through a client device identifier), and/or a user identifier of a user that operates the particular client device. Thus, if content delivery system 120 manages delivery of multiple content items, then different impression data items may be associated with different content items. One or more of these individual data items may be encrypted to protect privacy of the end-user.

Similarly, a click data item may indicate a particular content item summary, a date of the user selection, a time of the user selection, a particular publisher or source (e.g., onsite v. offsite), a particular client device that displayed the specific content item, and/or a user identifier of a user that operates the particular client device. If impression data items are generated and processed properly, a click data item should be associated with an impression data item that corresponds to the click data item. From click data items and impression data items associated with a content item summary, content delivery system 120 may calculate a CTR for the content item summary.

Multi-Objective Optimization System

Figure 2:
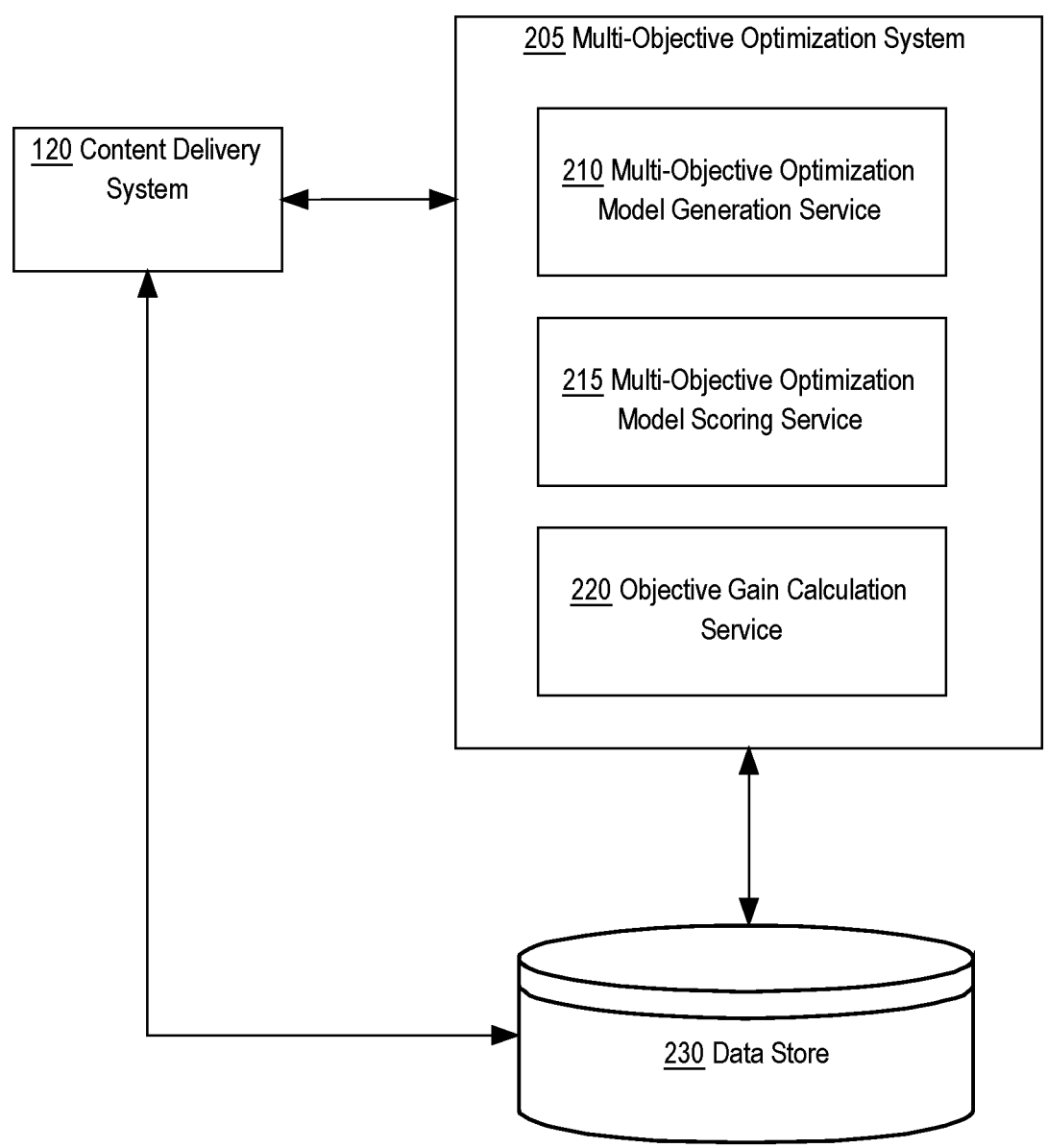
FIG. 2 depicts a block diagram of an example software-based system for estimating performance gains corresponding to modifications of content item selection parameters for content delivery.

FIG. 2 depicts a block diagram of an example software-based system for estimating performance gains corresponding to modifications of content item selection parameters for content delivery. In an embodiment, a multi-objective optimization system 205 implements a multi-objective optimization model in order to evaluate performance gains associated with changes to one or more parameters for one or more objectives measured by the multi-objective optimization model. Multi-objective optimization describes a method of simultaneously optimizing a problem that involves a plurality of objective functions. For example, the multi-objective optimization model may incorporate two or more of the following objectives: maximizing click through rates, maximizing number of clicks, maximizing number of views, maximizing revenue, maximizing number of user sessions, maximizing length of user sessions, maximizing viral actions (e.g., likes, shares, and/or comments), maximizing dwell time on each content item, minimizing skips of content items, minimizing bounce rates, minimizing negative responses, or any other defined objective. A multi-objective optimization model may also one or more of these objectives that pertain to different types of content items, such as feed content items, articles, blog posts, job postings, advertisements, and learning resources.

In an embodiment, the multi-objective optimization system 205 may be communicatively coupled to the content delivery system 120 for the purposes of selecting one or more candidate content items for a content delivery campaign. Candidate content items may refer to content items that are available for selection for a content delivery campaign. In another embodiment (not shown in FIG. 2), the multi-objective optimization system 205 may be integrated as part of the content delivery system 120. In an embodiment, the multi-objective optimization system 205 may include a multi-objective optimization generation service 210, a multi-objective optimization model scoring service 215, and an objective gain calculation service 220.

In an embodiment, a data store 230 may represent data storage configured to store user interaction data from user sessions and content item selection data, such as marketplace auction data. For example, the data store 230 may store a previous week's worth of user interaction data as well as marketplace auction data describing content item selection events for content delivery campaigns.

Multi-Objective Optimization Model

The multi-objective optimization model may be implemented using an algorithm that includes functions for each desired objective. For example, if the desired objective is a level of user engagement measured by whether a user applies for a job posting presented in a content item, then a user engagement function may represent the desired objective and a weight parameter may be used to assign weight to the desired objective. In an embodiment, the multi-objective optimization (MOO) algorithm may be represented as:

$$\text{MOO Score} = \text{bid}_{CPC} \times p\text{CTR} + \text{shadowBid}_1 \times p\text{Apply}$$

where:
The MOO score represents the multi-objective optimization score for a particular content item. The pApply represents a function for estimating the probability that a user will apply for the job represented by the particular content item. In an embodiment, the pApply function may have one or more input parameters including, but not limited to, user-based properties associated with a user's skills, job credentials, or job experience, a content item type such as job posting type, and positional ranking of the content item with respect to other content items.

The shadowBid parameter represents an adjustable weight parameter configured to give more or less weight to the pApply function with respect to the other functions that make up the multi-objective optimization algorithm.

The pCTR represents a function for estimating the probability that a user will click on the content item. The pCTR function may represent the desired objective of maximizing revenue from the corresponding content item.

The $bid_{CPC}$ represents a cost per click auction bid value for the particular content item. The $bid_{CPC}$ represents an example of an adjustable weight parameter for the pCTR function. In an embodiment, the $bid_{CPC} \times pCTR$ represents the objective of estimating revenue for the particular content item based upon the cost per click auction bid ($bid_{CPC}$) and the probability that a user will click on the particular content item (pCTR).

The $bid_{CPC}$ parameter may be based upon several factors including, but not limited to, historical bidding outcomes, probability of a click through by the user, and content item delivery conditions. In an embodiment, the $bid_{CPC}$ parameter may be represented as:

$$bid_{CPC} = bid_{rateCard} \times eCPC \times delivery_{adj}$$

where:

The $bid_{rateCard}$ parameter represents an initial bid amount that is based upon an industry segment for the content item and the level of competition with that industry segment. For example, if the industry segment is a very competitive and crowded segment, then the initial bid amount may be a high value. However, if the industry segment is not a competitive segment, then the initial bid amount may be significantly lower.

The eCPC represents an estimated cost per click value that is based upon how well a user aligns with a job posting represented by the content item. For example, if a user's profile properties indicate that the user is or is looking for a software management job and the content item represents a software management job, then the eCPC may represent a high value. In an embodiment, the eCPC may be represented as:

$$eCPC = \frac{QualityApplicantScore}{AverageQualityApplicantScore_{perJob}}$$

where QualityApplicantScore represents a value of how well the user aligns with the specific job of the content item. The Average QualityApplicantScore$_{perJob}$ represents an average value of how well each user aligns with the specific job of the content item. Therefore eCPC represents how well the user aligns with the specific job of the content item with respect to other users. The $delivery_{adj}$ represents a pacing parameter for content item delivery. For example, each content item may have a maximum daily bid budget and the $delivery_{adj}$ parameter may be used to ensure that the daily bid budget lasts for the entire day and is not exhausted too early or too late. For instance, if the current bid exhausts a large portion of the daily budget early in the day, the $delivery_{adj}$ parameter may be used to slow the pace of content delivery to users such that the entire budget lasts for the day.

Content item have been described as representing a job posting. Other examples of content items may represent any one of photos, videos, news articles, documents, user posts, audio clips, or any other content that may be displayed within a feed, advertisement, or during a user session. For the purposes of this disclosure, the MOO model and MOO algorithm terms may be used interchangeably.

Other embodiments of the MOO algorithm may include more or less functions depending upon the number of desired objectives. For example, the multi-objective optimization algorithm may include additional objectives such as:

Moo Score=$(bid_{CPC} \times pCTR)+(shadowBid_1 \times pApply)+ (shadowBid_2 \times Obj_{Func2})+ \ldots (shadowBid_N \times Obj_{FuncN})$ where $Obj_{Func2}$ through $Obj_{FuncN}$ represents additional functions for additional objectives. ShadowBids 1-N represents different weight parameters associated with each of the functions.

Multi-Objective Optimization Model Generation Service

The multi-objective optimization model generation service 210 retrieves user interaction data and content item selection data from the data store 230. User interaction data may refer to recorded interactions of users during various user sessions. For example, user interactions include selections of content items from feeds and other sources, clicks on links to web pages, and any other user interactions that occur during a user session. Content selection data may refer to data related to selecting which content items are delivered to users. For example, content selection data may include bid amounts to display content items from an auction. The user interaction data and content selection data retrieved by the multi-objective optimization model generation service 210 from the data store 230 and may be used to as input for the multi-objective optimization model. In an embodiment, the multi-objective optimization model generation service 210 may retrieve user interaction data and content selection data over a specific period of time. For example, the multi-objective optimization model generation service 210 may retrieve one week's worth of user interaction and content selection data for a given set of users.

Multi-Objective Optimization Model Scoring Service

In an embodiment, the multi-objective optimization model scoring service 215 assigns a MOO score to each content item using the MOO algorithm that incorporates functions for each desired objective. For example, the multi-objective optimization model scoring service 215 may calculate MOO scores for each candidate content item using the user interaction data and content selection data retrieved by the multi-objective optimization model generation service 210 to calculate values of objective functions that make up the MOO algorithm. Upon calculating the MOO scores for each of the candidate content items, the multi-objective optimization model scoring service 215 may rank the candidate content items in order to determine which content items satisfy the multiple desired objectives reflected in the MOO algorithm.

Objective Gain Calculation Service

In an embodiment, the objective gain calculation service 220 determined a level of performance gains associated with possible parameter value changes applied to the MOO algorithm using the MOO model. For example, the multi-objective optimization model scoring service 215 may be used to calculate MOO scores and rank candidate content items based upon adjusting parameter values associated with objective functions of the MOO algorithm. The objective gain calculation service 220 may be used to evaluate potential gains for each of the desired objectives in order to determine which parameter adjustments should be pursued.

Processing Overview

Figure 3:
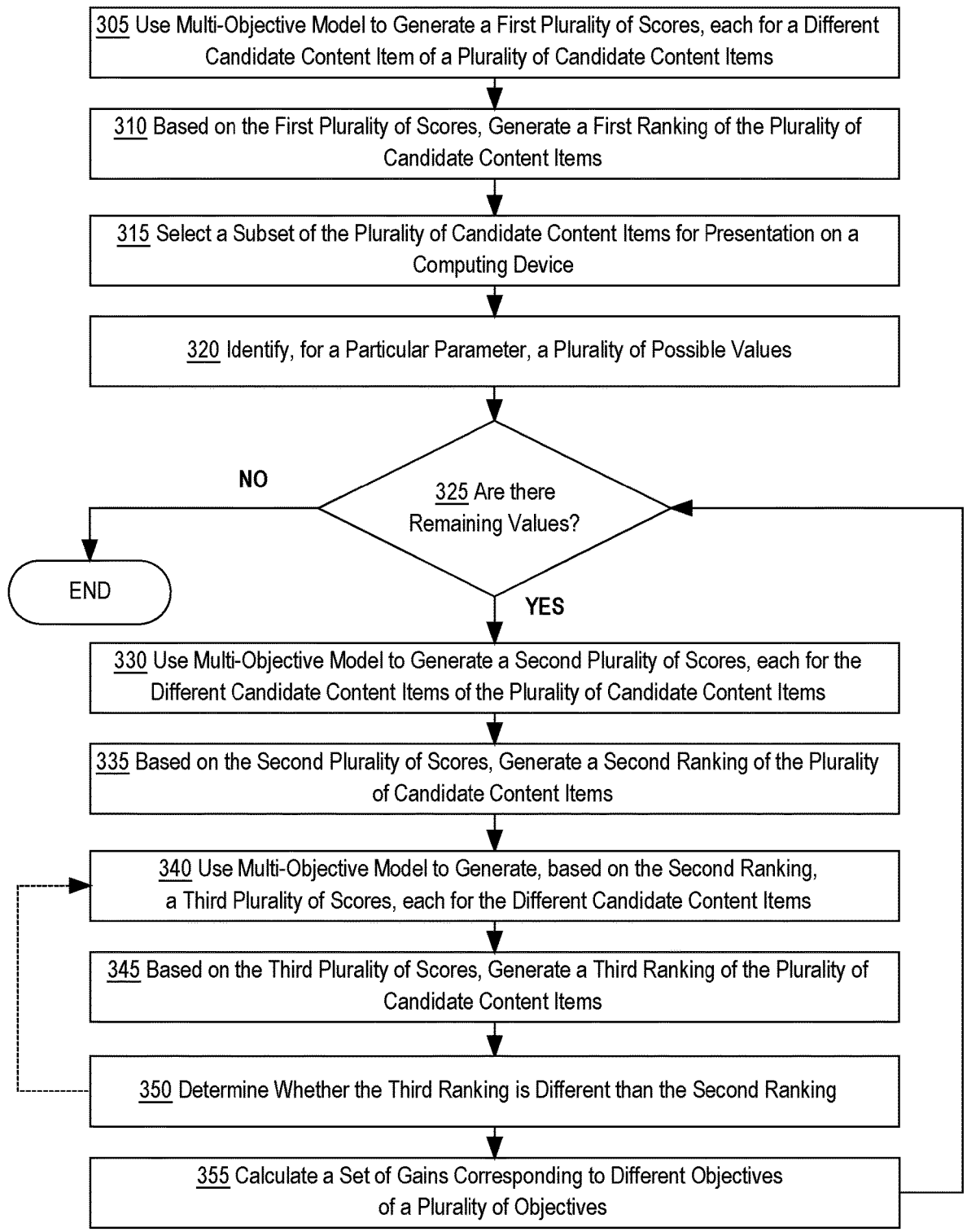
FIG. 3 depicts an example flowchart for estimating performance gains based upon modifying parameters associated with multi-objective optimization of content delivery.

FIG. 3 depicts an example flowchart for estimating performance gains based upon modifying parameters associated with a multi-objective optimization model for content item delivery. Process 300 may be performed by a single program or multiple programs. The operations of the process as shown in FIG. 3 may be implemented using processor-executable instructions that are stored in computer memory. For purposes of providing a clear example, the operations of FIG. 3 are described as performed by the multi-objective optimization system 205 and its components. For the purposes of clarity process 300 is described in terms of a single entity.

In operation 305, process 300 generates a first plurality of scores for a plurality of candidate content items using the multi-objective optimization model. In an embodiment, the multi-objective optimization model generation service 210 may retrieve, from the data store 230, user interaction data and content item selection data for a set of users and the plurality of candidate content items for a specific period of time. For example, the multi-objective optimization model generation service 210 may retrieve one week's worth of content item impression data for content items that participated in a marketplace auction and user interaction data for the content items from the data store 230. The user interaction data and content item impression data may be used to as input for the multi-objective optimization model.

Figure 4:
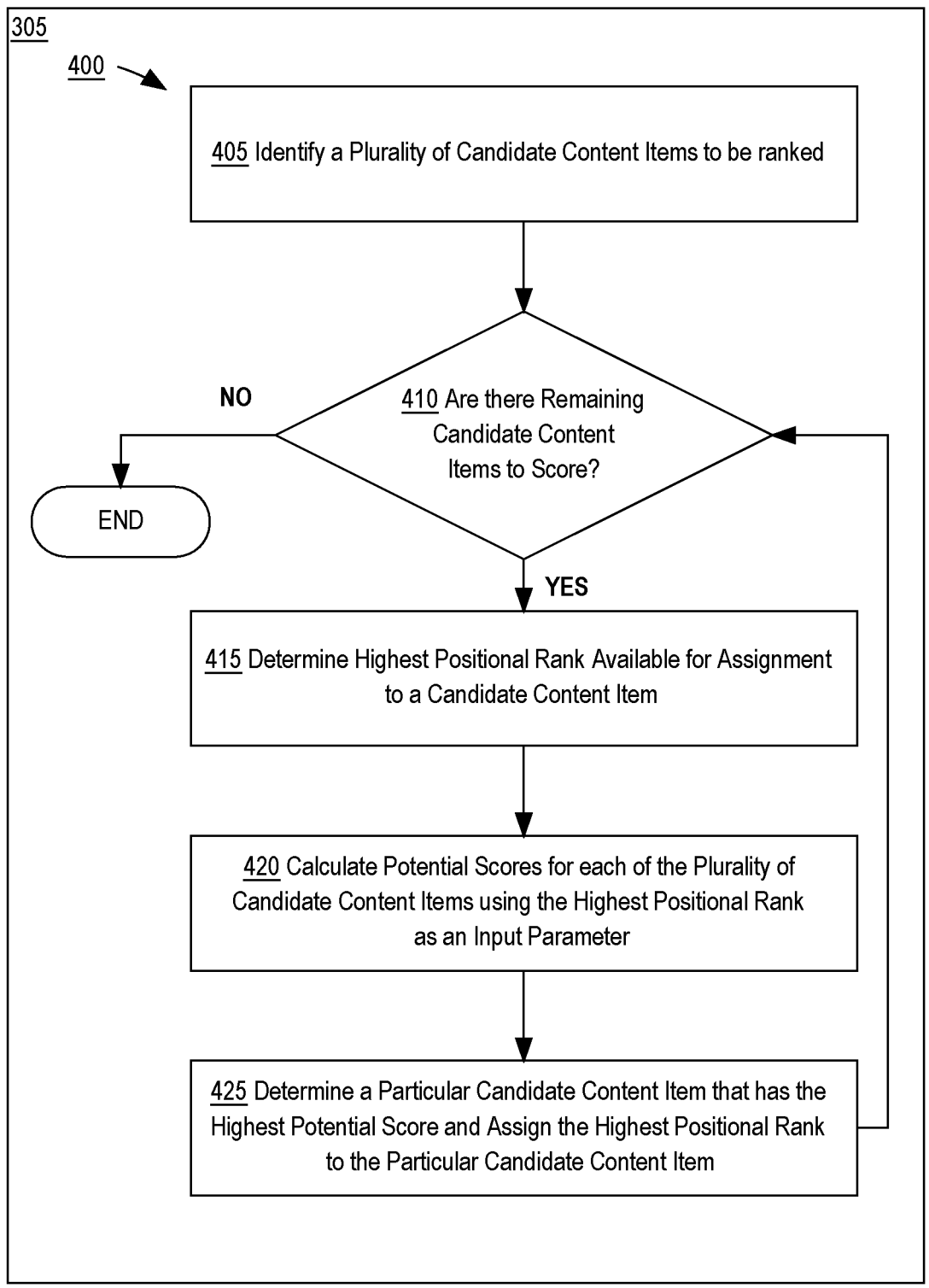
FIG. 4 depicts an example flowchart for generating a first plurality of scores for a plurality of candidate content items.

In an embodiment, the multi-objective optimization model scoring service 215 may calculate MOO scores for each of the candidate content items of the plurality of candidate content items using the MOO algorithm. FIG. 4 depicts an example flowchart for generating the first plurality of scores for the plurality of candidate content items. Process 400 may be performed by a single program or multiple programs. The operations of the process as shown in FIG. 4 may be implemented using processor-executable instructions that are stored in computer memory. For purposes of providing a clear example, the operations of FIG. 4 are described as performed by the multi-objective optimization model scoring service 215. For the purposes of clarity process 400 is described in terms of a single entity.

In an embodiment, the multi-objective optimization model scoring service 215 receives the plurality of candidate content items from the multi-objective optimization model generation service 210 for calculating MOO scores for each candidate content item. In operation 405, process 400 identifies the plurality of candidate content items to be scored from content items stored in the data store 230 that are available for a selection event. In an embodiment, the multi-objective optimization model generation service 210 may identify the plurality of candidate content items from the data store 230 that need to be scored using the MOO algorithm.

In decision diamond 410, process 400 determines whether there are remaining candidate content items to be scored. In an embodiment, the multi-objective optimization model scoring service 215 iterates through and scores each candidate content item in the plurality of candidate content items. The multi-objective optimization model scoring service 215 determines whether there are candidate content items in the plurality of candidate content items yet to be scored. If there are remaining candidate content items to be scored, then the multi-objective optimization model scoring service 215 proceeds to operations 415-430 to select a positional rank value and score the remaining candidate content items using the select positional rank value. If, however, all of the candidate content items have been scored, then process 400 ends.

In operation 415, process 400 determines a highest positional rank available for assignment to a candidate content item. In an embodiment, the multi-objective optimization model scoring service 215 ranks the plurality of candidate content items based upon their respective MOO scores. As described, the MOO score is based upon the MOO algorithm that contains multiple objective functions. The multiple objective functions may be configured to receive, as input, parameters that include user-based properties, content item properties, and a positional rank for the candidate content item with respect to the plurality of candidate content items. For example, the MOO algorithm may include:

$$\text{Moo Score} = (\text{bid}_{CPC} \times p\text{CTR}) + (\text{shadowBid}_1 \times p\text{Apply}) + (\text{shadowBid}_2 \times \text{isClicked})$$

where the objective functions are pCTR, pApply, and isClicked.

In an embodiment, objective functions such as pApply and isClicked may have, as input, parameters that include user-property, content-item-type, and positional-rank. User-properties may include any relevant user property values, such as current occupation, education, degrees, or any other user property values that may be relevant to the candidate content item. For instance, if the candidate content item is a job posting then user-properties such as current occupation, education, and degrees represent may be relevant to determining whether the user is more or less likely to click on the job posting, apply for the posting, or otherwise interact with the job posting in some way. The content-item-type input parameter may be used to indicate the type of candidate content item to be scored and to help evaluate the relevance of the candidate content item to users. For example, if the candidate content item is a job posting for a database engineer and the user is a database engineer, then it may be more likely that the user may interact with the candidate content item than other types of job postings.

In an embodiment, the positional rank may represent the relative rank of the candidate content item with respect to the other candidate content items for the purpose of selection and content item delivery. For example, if a candidate content item is ranked highly, such as ranked in the first position, then the candidate content item is more likely to be selected for content item delivery to users than other candidate content items that have been ranked lower. Since the initial scoring and ranking has yet to be performed, the multi-objective optimization model scoring service 215 may assign the highest positional rank to each of the candidate content items in the set of remaining candidate content items. By assigning the highest positional rank to each candidate content item, each of the calculated MOO scores from the candidate content items will represent the highest possible MOO score available. Thus, MOO scores for each candidate content item will be based upon their respective user-property and content-item-type input parameters, as each candidate content item will receive the same input parameter for positional rank.

In operation 420, process 400 calculates potential scores for each of the candidate content items in the plurality of candidate content items that have yet to be scored using the highest positional rank as an input parameter. In an embodiment, the multi-objective optimization model scoring service 215 uses the MOO algorithm, where the input parameter for positional rank for each objective function has been set of the highest positional rank available. For example, if the plurality of candidate content items contains 10 candidate content items and the highest positional rank is equal to 1, then the multi-objective optimization model scoring service 215 calculates potential scores of each of the 10 candidate content items using the MOO algorithm with the positional rank set to 1.

In operation 425, process 400 determines a particular candidate content item that has the highest potential score and assigns the highest positional rank available to the particular candidate content item. In an embodiment, the multi-objective optimization model scoring service 215 analyzes each of the potential scores for the candidate content items and determines the particular candidate content item that has the highest potential MOO score. Since each of the candidate content items scored in operation 420 was based upon the highest positional rank, then the particular candidate content item that has the highest potential MOO score represents the candidate content item most likely to be selected without factoring in positional rank, as each potential MOO score was calculated with the same positional rank. The multi-objective optimization model scoring service 215 may then assign the highest positional rank available to the particular candidate content item and the potential MOO score of the particular candidate content item becomes the MOO score of the particular candidate content item.

Process 400 then proceeds to decision diamond 410 to iterate through the remaining candidate content items to be scored. The remaining candidate content items of the plurality of candidate content items may include all of the candidate content items scored in operation 420 that did not have the highest potential score. In an embodiment, at decision diamond 410 process 400 determines whether there are candidate content items in the plurality of candidate content items yet to be scored. If there are remaining candidate content items to be scored, then the multi-objective optimization model scoring service 215 proceeds to operations 415-425. In operation 415, process 400 determines the highest positional rank available for assignment to candidate content items. For example, if positional rank value #1 has already been assigned to the particular candidate content item that has been scored, then the multi-objective optimization model scoring service 215 may select the next available positional rank value, such as #2. In operation 420, process 400 calculates potential scores for each of the remaining candidate content items in the plurality of candidate content items. In operation 425, process 400 then determines the candidate content item that has the highest potential score based upon the highest positional rank (e.g. position #2) and assigns that candidate content item the highest positional rank and assigns the calculated MOO score to the candidate content item. In an embodiment, process 400 repeats operations 410-425 until each of the candidate content items have been assigned a positional rank and a MOO score based upon the assigned positional rank. If, at decision diamond 410, there are no remaining candidate content items to be scored, then process 400 ends with each of the candidate content items having been assigned a first score using the MOO algorithm.

Referring to FIG. 3 at operation 310, process 300 generates a first ranking of the plurality of candidate content items based on the first plurality of scores. In an embodiment, the multi-objective optimization model scoring service 215 ranks each of the candidate content items, of the plurality of candidate content items, based upon their MOO scores calculated in operation 305. For example, if the plurality of candidate content items includes 10 candidate content items, then the 10 candidate content items are ranked where the candidate content item with the highest MOO score is ranked first and the next highest candidate content item is ranked second and so on.

FIG. 5 depicts example tables of calculated MOO scores for a plurality of candidate content items. Table 505 illustrates candidate content items ranked based on their calculated MOO scores. Table 505 contains columns that describe MOO scores, a ranked positions, calculated objective function values, and other input parameters for the candidate content items. Column 510 represents a unique content item request ID, which represents a unique content item identifier that is used to identify impressions, clicks, applies, and any other user interactions related to a specific content item. For example, the content item request ID may be used to track each of the interactions of a specific content item by users. Column 512 represents a MOO score calculated by the MOO algorithm. Column 514 represents a ranking position for the candidate content items based upon the MOO score in column 512. For example, content item request ID 101 has a MOO score of 12.01 and is ranked in the first position, while content item request ID 102 has a MOO score of 11.50 and is ranked in the second position. Column 516 represents a bid value associated with generating an impression of the content item. Column 518 represents the click through rate probability for the candidate content items calculated by the pCTR objective function. Column 520 represents the probability that a given user will apply for the job represented by the specific candidate content item, which is calculated by the pApply objective function. Column 522 represents the probability that a given user will click on the specific candidate content item. Column 524 represents the probability that a given user will apply for the job represented by the specific candidate content item. Column 526 represents an input parameter value for the estimated cost per click value, which is based upon how well a user aligns with a job posting represented by the content item. Column 528 represents an input parameter value for an initial bid amount that is based upon an industry segment for the content item and the level of competition with that industry segment.

In operation 315, process 300 selects a subset of the plurality of candidate content items for presentation on a computing device. In an embodiment, the multi-objective optimization system 205 selects a subset of candidate content items from the plurality of candidate content items based upon the first plurality of scores. For example, the multi-objective optimization system 205 may select a subset of the top scored candidate content items. The subset may be a subset based upon a specified number of candidate content items, such as the top five or ten, or may be based upon a top tier percentage of candidate content item, such as the top 10% or top 20% of candidate content items based upon their respective MOO scores.

In another embodiment, the multi-objective optimization system 205 may send the plurality of candidate content items to the content delivery system 120 along with their respective MOO scores. The content delivery system 120 may be programmed to then select the subset of the plurality of candidate content items based upon their MOO scores.

In operation 320, process 300 identifies a plurality of possible values for a particular parameter of the MOO algorithm. In an embodiment, the multi-objective optimization scoring service 215 identifies a plurality of possible values, which are different from the current value, for the particular parameter of the MOO algorithm for the purpose of further optimizing content delivery based upon a change of the value for the particular parameter. The plurality of possible values may represent a set of different values, from the current value, that may be tested within the multi-objective optimization model in order to identify potential parameter value changes that improve content delivery to users based upon the multiple desired objectives. For example, referring to the MOO algorithm described:

$$\text{Moo Score}=(\text{bid}_{CPC} \times p\text{CTR})+(\text{shadowBid}_1 \times p\text{Apply})+(\text{shadowBid}_2 \times \text{Obj}_{Func2})+ \ldots (\text{shadowBid}_N \times \text{Obj}_{FuncN})$$

the multi-objective optimization scoring service 215 may select any one of the parameters $\text{shadowBid}_{1, 2, \ldots N}$ for changing the parameter value. The plurality of possible values may represent a set of values, such as {0.1, 0.2, 1, 1.5, 2.5, 10, 15, . . . M} that are different from the current value. Each of the values of the plurality of possible values may affect the weight of the particular objective function and in turn may change the overall MOO scores for each candidate content item. For instance, if $\text{shadowBid}_1$ is selected as the particular parameter and the plurality of possible values includes {0.1, 0.2, 1, 1.5, 2.5, 10, 15}, then the MOO algorithm may be given a different amount of weight to pApply which may change the overall MOO scores for each candidate content item. In other embodiments, any one of the input parameters, such as shadowBid, $\text{bid}_{CPC}$, content item type properties, and user properties, may be modified in order to estimate potential performance gains based upon new values.

In an embodiment, process 300 may recalculate MOO scores and may re-rank each of the candidate content items based upon the plurality of possible values for a particular parameter of the MOO algorithm. Operations 325-355 may be iteratively performed on each of the possible values in order to assess which of the possible values may yield a performance gain based on the multiple objectives depicted in the MOO algorithm.

In decision diamond 325, process 300 determines whether there are remaining values of the plurality of possible values to evaluate for potential performance optimization gains. In an embodiment, the multi-objective optimization scoring service 215 iteratively evaluates each of the plurality of possible values for the particular parameter in order to evaluate whether there is a potential optimization gain associated with each possible value. If, as decision diamond 325, the multi-objective optimization scoring service 215 determines that there are remaining possible values to evaluate, then the multi-objective optimization scoring service 215 proceeds to operations 330-355 to calculate new MOO scores and determine potential optimization gains for each of the remaining possible values. The multi-objective optimization scoring service 215 selects one of the possible values (herein referred to as modified value) and proceeds to operation 330. If however, at decision diamond 325, process 300 determines that there are no remaining possible values for analysis, then process 300 ends.

In operation 330, process 300 uses the multi-objective optimization model to generate a second plurality of scores for each of the candidate content items in the plurality of candidate content items. In an embodiment, the multi-objective optimization scoring service 215 generates the second plurality of MOO scores for the plurality of candidate content items using the MOO algorithm with the modified value selected, from the plurality of possible values, for the particular parameter and the positional ranks assigned to each of the candidate content items from operation 310. For example, if a first candidate content item has an assigned positional rank of 1, then the multi-objective optimization scoring service 215 will calculate a new MOO score for the first candidate content item using "1" as the input value for the positional rank input parameter for the objective functions in the MOO algorithm. The MOO algorithm may be represented as:

$$\text{Moo Score}=(\text{bid}_{CPC} \times p\text{CTR})+(\text{shadowBid}_1 \times p\text{Apply})+(\text{shadowBid}_2 \times \text{Obj}_{Func2})+ \ldots (\text{shadowBid}_N \times \text{Obj}_{FuncN})$$

where $\text{shadowBid}_1$ is the particular parameter and the value of $\text{shadowBid}_1$ is set to the modified value selected by the multi-objective optimization scoring service 215. The multi-objective optimization scoring service 215 may calculate the second plurality of MOO scores using the modified value for $\text{shadowBid}_1$. In an embodiment, MOO scores generated using the MOO algorithm are functions of positional ranks of the corresponding candidate content items. The objective functions that make up the MOO algorithm may include the candidate content item positional rank as an input parameter. Thus, making the MOO scores dependent on the positional ranking of a candidate content item with respect to the other candidate content items. If the calculated MOO scores for the plurality of candidate content items yield a different ranking than the rankings (first ranking) used as input parameters for the objective functions, then the MOO scores may need to be recalculated.

In operation 335, process 300 generates a second ranking of the plurality of candidate content items based upon the second plurality of scores. In an embodiment, the multi-objective optimization scoring service 215 uses the generated second plurality of MOO scores of the plurality of candidate content items to generate a second ranking of the plurality of candidate content items, where the second ranking is different from the first ranking. If the second ranking is different from the first ranking, then the MOO scores may need to be recalculated. For example, if the second plurality of MOO scores indicates that a second candidate content item, which was previously ranked second, has the highest MOO score, then the multi-objective optimization scoring service 215 may rank the second candidate content item as the top candidate content item and the remaining candidate content items are ranked corresponding to the respective MOO scores. Referring to FIG. 5, table 540 illustrates candidate content items ranked based on the second plurality of MOO scores calculated in operation 330. Content item request ID 101 now has a MOO score of 11.91 and content item request ID 102 now has a MOO score of 13.45. As a result the second ranking of the plurality of candidate content items would have content item request ID 102 ranked first and content item request ID 102 ranked second.

In an embodiment, if ranking of the candidate content items change between the first ranking and the second ranking of the plurality of candidate content items, then the multi-objective optimization scoring service 215 may recalculate each of the MOO scores for the plurality of candidate content items, where for each candidate content item their respective positional rank from the second ranking is used as the rank position parameter input value for the objective functions in the MOO algorithm. For example, when calculating the MOO score for content item request ID 102, the rank position parameter input value for objective functions, such as pApply, would be equal to 1. Previously, the MOO score for content item request ID 102 was calculated using the rank position parameter input value equal to 2, based upon the first ranking (see table 505). As described, the rank position parameter input value may affect the output values of the objective functions within the MOO algorithm. For instance, the pApply objective function may output a higher value if the content item is ranked higher within the content item marketplace auction, as higher ranked content items are more likely to be displayed to users than lower ranked content items. Similarly, the MOO score for the content item request ID 101 may be lower when using the rank position parameter value of 2, from the second ranking.

In operation 340, process 300 generates a third plurality of scores for the plurality of candidate content items based upon the second ranking. In an embodiment, the multi-objective optimization scoring service 215 generates the third plurality of MOO scores for the plurality of candidate content items using the MOO algorithm with the modified value selected, from the plurality of possible values, for the particular parameter and the positional ranks corresponding to each of the candidate content items based on the second ranking.

In operation 345, process 300 generates a third ranking of the plurality of candidate content items based upon the third plurality of scores. In an embodiment, the multi-objective optimization scoring service 215 uses the generated third plurality of MOO scores of the plurality of candidate content items to generate the third ranking of the plurality of candidate content items.

In operation 350, process 300 determines whether the third ranking of the plurality of candidate content items is different from the second ranking. In an embodiment, the multi-objective optimization scoring service 215 compares the second ranking to the third ranking of the plurality of candidate content items to determine whether candidate content items are ranked differently. If there is a difference in ranking between the second ranking and the third ranking, then the multi-objective optimization scoring service 215 may recalibrate the MOO scores using the latest ranking (the third ranking).

In an embodiment, the multi-objective optimization scoring service 215 may recalibrate the MOO scores by repeating operations 340 and 345 using the third ranking to generate a new plurality of scores. For example, the multi-objective optimization scoring service 215 may proceed back to operation 340 and generate a fourth plurality of scores for the plurality of candidate content items using the positional ranks of the candidate content items as input parameters for the objective functions within the MOO algorithm. In operation 345, the multi-objective optimization scoring service 215 may generate a fourth ranking based on the fourth plurality of scores for the plurality of candidate content items. In operation 350, the multi-objective optimization scoring service 215 determines whether the fourth ranking (currently generated ranking) is different from the third ranking (previous ranking). If the rankings of the candidate content items are identical, then the MOO scores have been calibrated for the currently generated ranking and the multi-objective optimization scoring service 215 may proceed to operation 355 to calculate potential gains for the modified value of the particular parameter. If however, the fourth ranking (currently generated ranking) is different from the third ranking (previous ranking), then the multi-objective optimization scoring service 215 may further recalibrate the MOO scores by proceeding back to operations 340 and 345 to recalculate the MOO scores based on the fourth ranking (currently generated ranking).

Referring to FIG. 3, in operation 355 process 300 calculates a set of gains corresponding to different objectives of a plurality of objectives. In an embodiment, the objective gain calculation service 220 calculates gains for the plurality of objectives that make up the MOO algorithm. For example, if the MOO algorithm includes objective functions for predicted click-through rate (pCTR), predicted apply (pApply), and any other objective, then the objective gain calculation service 220 calculates gains for each of the objectives.

In an embodiment, the objective gain calculation service 220 may implement a discounted cumulative gain (DCG) algorithm to measure gains for each objective based on using the modified value for the particular parameter. The DCG algorithm is configured to measure performance gain of a candidate content item based upon its position relative to the other candidate content items in the plurality of candidate content items. The DCG algorithm rewards candidate content items that are ranked higher by awarding them higher gains and penalizes lower ranked candidate content items by awarding them smaller gains. The DCG algorithm may be represented as:

$$DCG_p = \sum_{i=1}^{P} \frac{2^{reward_i} - 1}{\log(i+1)}$$

where:

i is the candidate content item positional rank within the current ranking of the plurality of candidate content items. P is the total number of candidate content items ranked in the current ranking.

Reward$_i$ is a position-based reward value that is specific to the type of objective measured. For example, if the objective is revenue, then the reward may be calculated as a function of the candidate content item's final bid amount multiplied by the isClicked function value. If the objective is measuring gains of clicks, then the reward may be equal to the isClicked function value. If the objective is measuring gains of users applying for the job displayed by the candidate content item, then the reward may be equal to the isApplied function value.

In another embodiment, the objective gain calculation service 220 may implement a normalized discounted cumulative gain (NDCG) algorithm to measure gains for each objective based on adjustment of the particular parameter value to the selected value. The NDCG algorithm normalizes gains regardless of the length of the ranked list (size of the plurality of candidate content items) by dividing the DCG value by the maximum possible DCG value. For instance, cumulative gains for candidate content items may vary depending on the overall size of the ranked list. The NDCG may normalize gains by dividing the potential gain (DCG value) by the maximum possible gain. The NDCG algorithm may be represented as:

$$NDCG_p = \frac{DCG_p}{IDCG_p}$$

where $IDCG_p$ represents an ideal DCG. The $IDCG_p$ may be represented as:

$$IDCG_p = \sum_{i=1}^{(Ideal\ Ranking\ Sequence)} \frac{2^{reward_i} - 1}{\log(i+1)}$$

The objective gain calculation service 220 may determine gains for each of the objectives modeled within the MOO model. Upon calculating the gains for each of the objectives of the plurality of objectives, process 300 may proceed back to decision diamond 325 to determine whether there are remaining modified values of the plurality of possible values to model using the MOO model. If there are remaining modified values, then process 300 may proceed to operations 330-355 to generate MOO scores and candidate content item rankings associated with the next selected modified value for the particular parameter. If, however, there are no remaining modified values of the plurality of possible values to model, then process 300 may evaluate gains for each objective for each of the modified values to determine whether a modified value is to be implemented for content item selection during content delivery.

Figure 6:
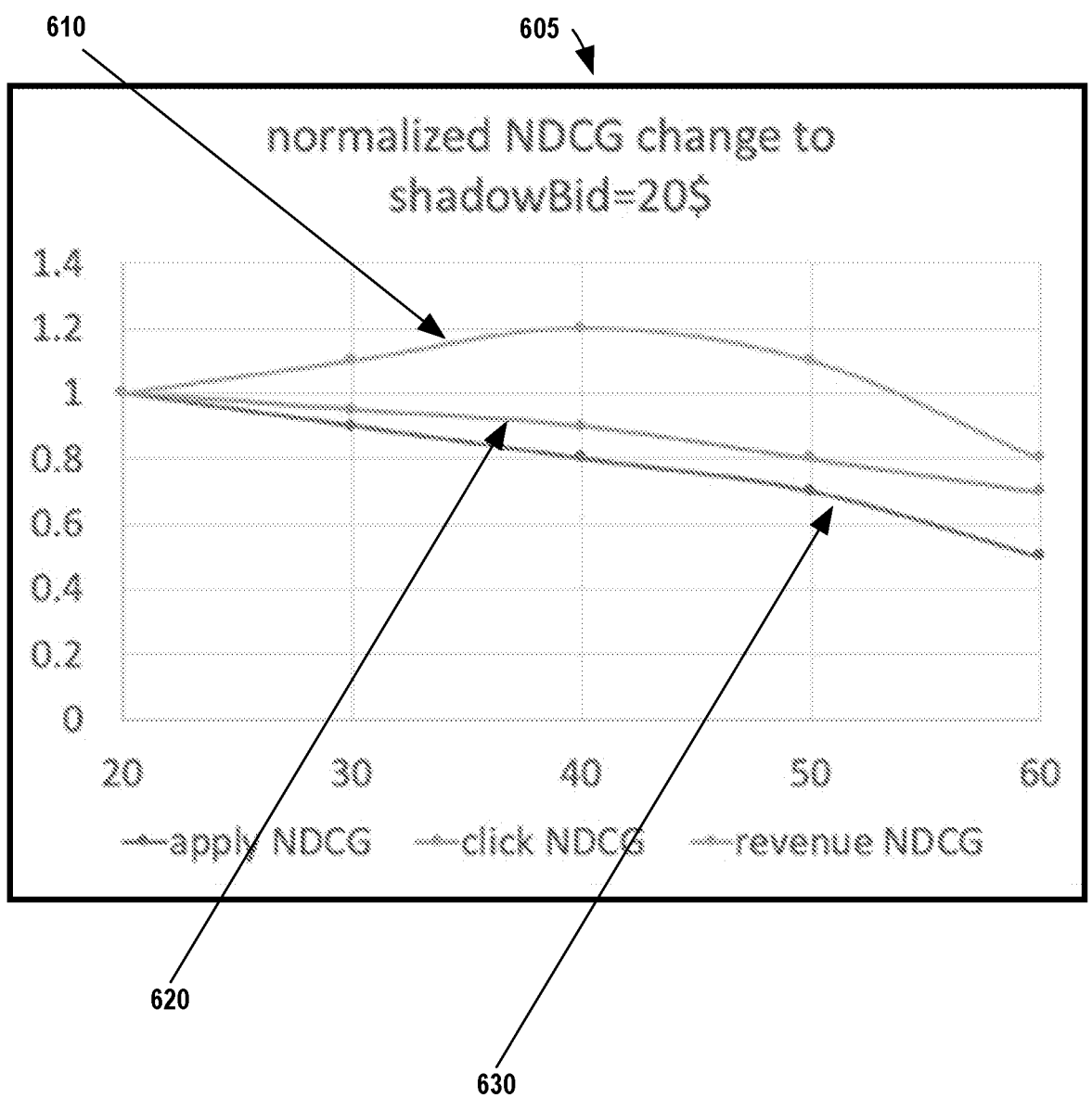
FIG. 6 depicts a graphical representation of normalized cumulative gains for each objective based on a plurality of possible values for a single parameter.

FIG. 6 depicts a graphical representation of normalized cumulative gains for each objective based on the plurality of possible values for a single parameter. Graph 605 depicts gains in terms of NDCG for each of the possible values modeled. Line 610 represents the NDCG for the revenue objective. Line 610 shows revenue gains when the shadowBid$_1$ value is adjusted to either 30, 40, or 50, where the highest revenue gain is at 40. Line 620 represents the NDCG for a click objective. Line 620 shows that the highest click return is when the shadowBid$_1$ value is set to 20 and click gains steadily decreasing as the shadowBid$_1$ value increases. Line 630 represents the NDCG value for the objective of the user applying for the job represented by the candidate content item displayed. Line 630 shows that the highest apply return is when the shadowBid$_1$ value is set to 20 and apply gains steadily decreasing as the shadowBid$_1$ value increases.

Performing Test Experiments

In an embodiment, the multi-objective optimization system 205 may be configured to select one or more modified values of the plurality of possible values that show a desired performance gain and use the one or more modified values to modify candidate content item selection for content delivery to users. For example, the objective gain calculation service 220 may select a subset of modified values that show performance gains for one or more objectives. The subset of modified values may include one or more modified values and may be based upon performance gains that are above a minimum gain threshold for a specific objective. For example, the objective gain calculation service 220 may select modified values for the particular parameter that estimate a 10+% revenue gain for the revenue objective. The minimum gain threshold may be specific to each type of desired objective. For instance, the minimum gain threshold for revenue may be set to a 10+% gain, while the minimum gain threshold for the user apply objective may be set to only 5%. In other examples, the minimum gain threshold may include a combination of performance gains from two or more objectives. In another embodiment, the objective gain calculation service 220 may select the subset of the plurality of possible values based upon which values yield the top performance gains. For example, the objective gain calculation service 220 selects the values that have the top 20% of performance gains.

After selecting the subset of modified values for the particular parameter, the multi-objective optimization service 205 may configure candidate content item selection to incorporate a modified value from the subset of modified values into the candidate content item selection criteria. In one example, the multi-objective optimization service 205 may use the MOO algorithm, with the modified value, to evaluate newly collected user interaction data and content item selection data from the data store 230 and select a subset of the plurality of candidate content items for presentation to users.

In yet another example, the multi-objective optimization system 205 may implement a series of online tests, such as AB testing, using the MOO algorithm with the modified value to test parameter modifications on a subset of users against a control group of a subset of users. The multi-objective optimization system 205 may then be able to run live parameter modification tests on subsets of users knowing that the modified value for the particular parameter has been estimated to yield a performance gain.

Embodiments described illustrate performance enhancements for candidate content item selection based upon estimating performance gains on historical data. The estimated performance gains of parameter modifications allow the multi-objective optimization system 205 to reduce the amount of processing resources needed to test various modifications to input parameters for a multi-objective content item delivery system. By estimating which modified values show the potential for performance gains and which modified values do not, the multi-objective optimization system 205 may reduce spending processing resources on tests that may yield little to no performance gains.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
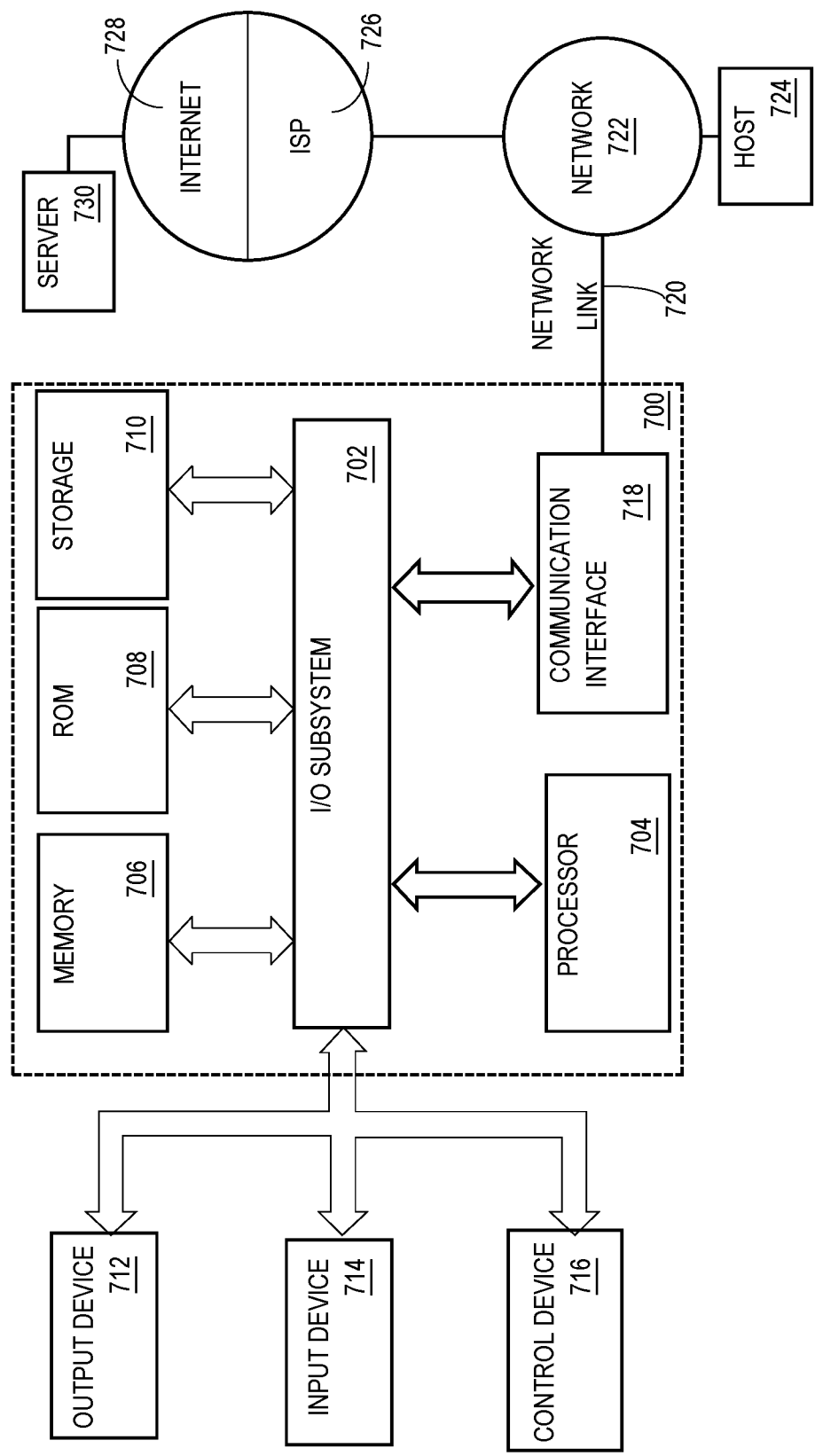
FIG. 7 is a block diagram that illustrates a computer system upon which an embodiment of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
maintaining a first ranking of a plurality of candidate content items, each candidate content item in the plurality of candidate content items ranked based on an initial score that has been generated using a multi-objective optimization model that comprises a weighted combination of parameters, each parameter representing a different objective, the initial score for each candidate content item derived using a first set of parameter values that correspond with respective parameters in the weighted combination of parameters;
for each possible parameter value in a set of possible parameter values for a particular parameter of the plurality of parameters of the multi-objective optimization model, replaying a content item selection event, wherein replaying the content item selection event comprises:
using the multi-objective optimization model generating a second score for each candidate content item in the plurality of candidate content items using a parameter value for at least one parameter in the weighted combination of parameters that differs from the parameter value used to generate the initial score for each candidate content item;
based on the second score generated for each candidate content item, generating a second ranking of the plurality of candidate content items, wherein the second ranking is different than the first ranking;
using the multi-objective optimization model generating a third score for each candidate content item of the plurality of candidate content items, wherein, for each candidate content item, the third score generated for the candidate content item is dependent upon the position of the candidate content item in the second ranking;
based on the third score generated for each candidate content item, generating a third ranking of the plurality of candidate content items; and
making a determination of whether the third ranking is different than the second ranking;
wherein the method is performed by one or more computing devices.

2. The method of claim 1, further comprising:
prior to replaying the content item selection event, conducting the content item selection event, wherein conducting comprises:
using the multi-objective optimization model generating the initial score for each candidate content item of the plurality of candidate content items;
based on the first score of each candidate content item, generating the first ranking of the plurality of candidate content items; and
selecting a subset of the plurality of candidate content items for presentation on a computing device, based on the first ranking.

3. The method of claim 1, further comprising:
upon determining that the third ranking is different than the second ranking, using the multi-objective optimization model to generate a fourth score for each candidate content item, wherein, for each candidate content item, the fourth score generated for the candidate content item is dependent upon the position of the candidate content item in the third ranking and a parameter value for at least one parameter in the weighted combination of parameters that differs from the parameter value used to generate the third score for each candidate content item;
based on the fourth score generated for each of the candidate content items, generating a fourth ranking of the plurality of candidate content items;
making a determination of whether the fourth ranking is different than the third ranking; and
based on the determination, calculating a gain for each objective, the gain for each objective representing a difference in the measure of the objective resulting from the change in parameter value when generating the fourth score for each candidate content item and a the measure of the objective resulting from the parameter value used to generate the initial score for each candidate content item.

4. The method of claim 1, further comprising, based on the determination that the third ranking is the same as the second ranking, calculating a gain for each objective, the gain for each objective representing a difference in the measure of the objective resulting from the change in parameter value when generating the third score for each candidate content item and a the measure of the objective resulting from the parameter value used to generate the initial score for each candidate content item.

5. The method of claim 4, wherein calculating the gain for each objective comprises:
for each objective of the plurality of objectives:
for each candidate content item of the plurality of candidate content items, determining a gain value for the objective as a function of a positional reward based on a positional rank, from the third ranking, of said candidate content item relative to the plurality of candidate content items;
calculating a cumulative gain for said objective by aggregating the gain values of the candidate content items in the plurality of candidate content items; and
collecting the cumulative gains of the plurality of objectives to generate a set of gains.

6. The method of claim 4, wherein determining the gain value for said candidate content item for said objective comprises:
calculating an ideal gain value that is a function of a size of the plurality of candidate content items; and
calculating the gain value, for said candidate content item for said objective, as a function of a positional reward based on a positional rank of said candidate content item relative to the plurality of candidate content items divided by the ideal gain value.

7. The method of claim 6, wherein the ideal gain value is based upon a desired set size for the plurality of candidate content items.

8. The method of claim 1, wherein the particular parameter is a weight parameter for a function comprising one objective of an estimated click through rate and a probability of a user interacting with a candidate content item.

9. A computer program product comprising:
one or more non-transitory computer-readable storage media comprising instructions which, when executed by one or more processors, cause:
maintaining a first ranking of a plurality of candidate content items, each candidate content item in the plurality of candidate content items ranked based on an initial score that has been generated using a multi-objective optimization model that comprises a weighted combination of parameters, each parameter representing a different objective, the initial score for each candidate content item derived using a first set of parameter values that correspond with respective parameters in the weighted combination of parameters;

for each possible parameter value in a set of possible parameter values for a particular parameter of the plurality of parameters of the multi-objective optimization model, replaying a content item selection event, wherein replaying the content item selection event comprises:

using the multi-objective optimization model generating a second score for each candidate content item in the plurality of candidate content items using a parameter value for at least one parameter in the weighted combination of parameters that differs from the parameter value used to generate the initial score for each candidate content item;

based on the second score generated for each candidate content item, generating a second ranking of the plurality of candidate content items, wherein the second ranking is different than the first ranking;

using the multi-objective optimization model, generating a third score for each candidate content item of the plurality of candidate content items, wherein, for each candidate content item, the third score generated for the candidate content item is dependent upon the position of the candidate content item in the second ranking;

based on the third score generated for each candidate content item, generating a third ranking of the plurality of candidate content items; and making a determination of whether the third ranking is different than the second ranking.

10. The computer program product of claim 9, wherein the one or more non-transitory computer-readable storage media comprises further instructions which, when executed by the one or more processors, cause:

prior to replaying the content item selection event, conducting the content item selection event, wherein conducting comprises:

using the multi-objective optimization model generating the initial score for each candidate content item of the plurality of candidate content items;

based on the score of each candidate content item, generating the first ranking of the plurality of candidate content items; and selecting a subset of the plurality of candidate content items for presentation on a computing device, based on the first ranking.

11. The computer program product of claim 9, wherein the one or more non-transitory computer-readable storage media comprises further instructions which, when executed by the one or more processors, cause:

upon determining that the third ranking is different than the second ranking, using the multi-objective optimization model to generate a fourth score for each candidate content item, wherein, for each candidate content item, the fourth score generated for the candidate content item is dependent upon the position of the candidate content item in the third ranking and a parameter value for at least one parameter in the weighted combination of parameters that differs from the parameter value used to generate the third score for each candidate content item;

based on the fourth score generated for each of the candidate content items, generating a fourth ranking of the plurality of candidate content items;

making a determination of whether the fourth ranking is different than the third ranking; and based on the determination, calculating a gain for each objective, the gain for each objective representing a difference in the measure of the objective resulting from the change in parameter value when generating the fourth score for each candidate content item and a the measure of the objective resulting from the parameter value used to generate the initial score for each candidate content item.

12. The computer program product of claim 9, wherein the one or more non-transitory computer-readable storage media comprises further instructions which, when executed by the one or more processors, cause:

based on the determination that the third ranking is the same as the second ranking, calculating a gain for each objective, the gain for each objective representing a difference in the measure of the objective resulting from the change in parameter value when generating the third score for each candidate content item and a the measure of the objective resulting from the parameter value used to generate the initial score for each candidate content item.

13. The computer program product of claim 12, wherein calculating the gain for each objective comprises:

for each objective of the plurality of objectives:

for each candidate content item of the plurality of candidate content items, determining a gain value for the objective as a function of a positional reward based on a positional rank, from the third ranking, of said candidate content item relative to the plurality of candidate content items;

calculating a cumulative gain for said objective by aggregating the gain values of each of the candidate content items in the plurality of candidate content items; and collecting the cumulative gains of the plurality of objectives to generate a set of gains.

14. The computer program product of claim 12, wherein determining the gain value for said candidate content item for said objective comprises:

calculating an ideal gain value that is a function of a size of the plurality of candidate content items; and calculating the gain value, for said candidate content item for said objective, as a function of a positional reward based on a positional rank of said candidate content item relative to the plurality of candidate content items divided by the ideal gain value.

15. The computer program product of claim 14, wherein the ideal gain value is based upon a desired set size for the plurality of candidate content items.

16. The computer program product of claim 9, wherein the particular parameter is a weight parameter for a function comprising one objective of an estimated click through rate and a probability of a user interacting with a candidate content item.

* * * * *